Figure 6:
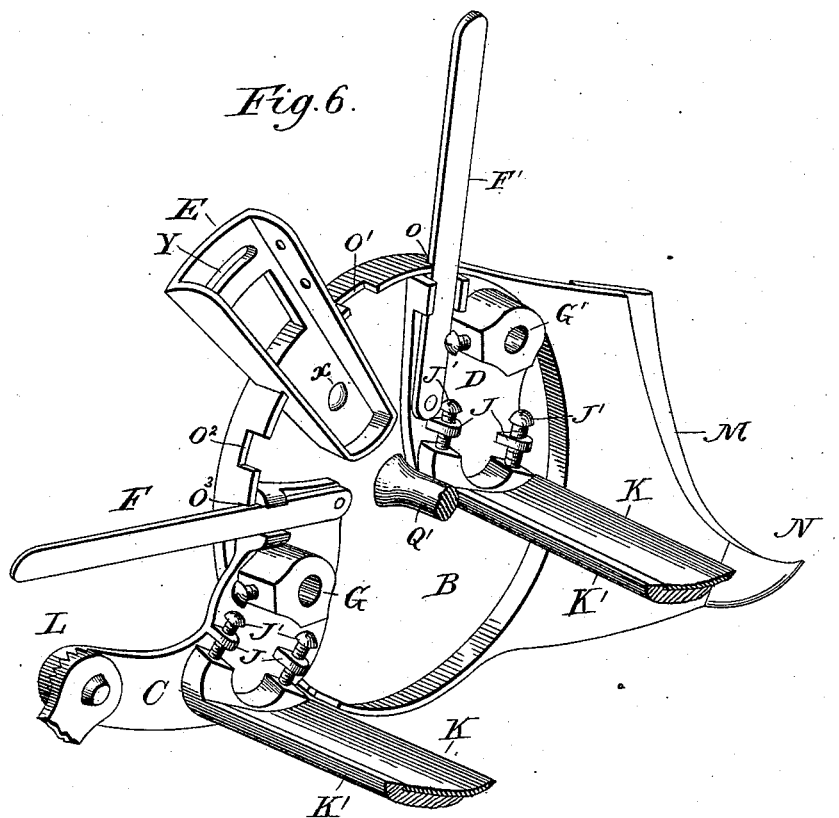

(No Model.) 2 Sheets—Sheet 1.
D. BEARLY.
LAWN MOWER.
No. 395,869. Patented Jan. 8, 1889.
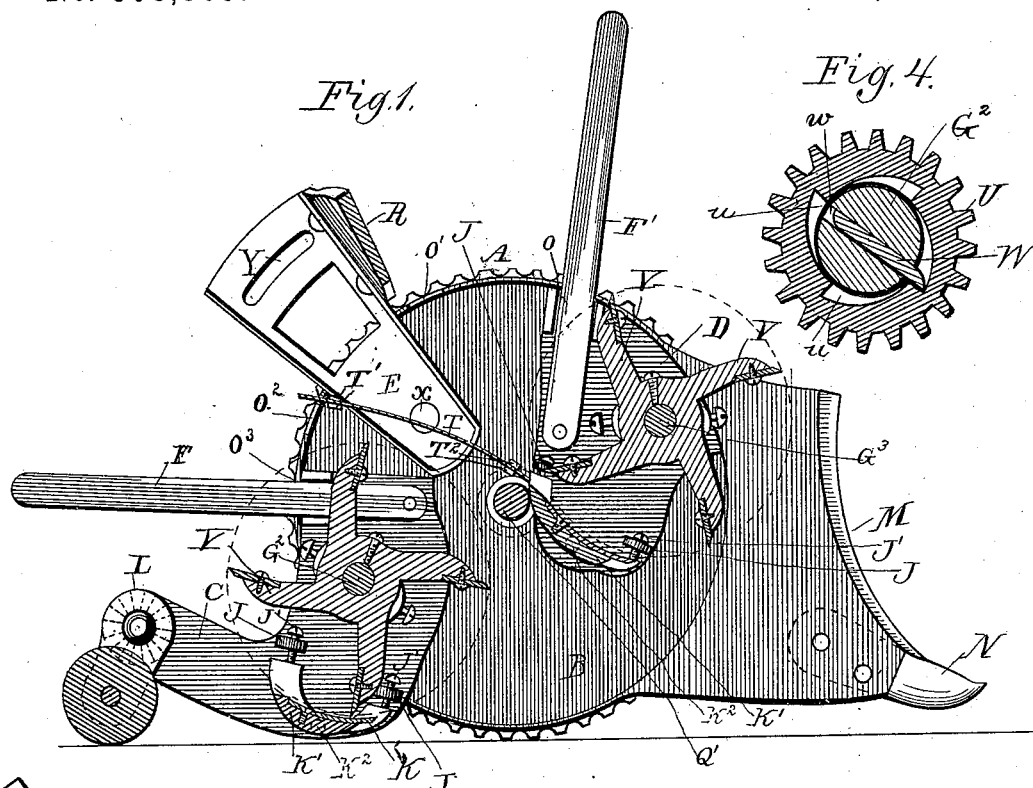
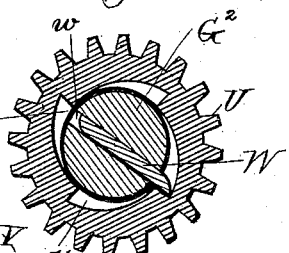
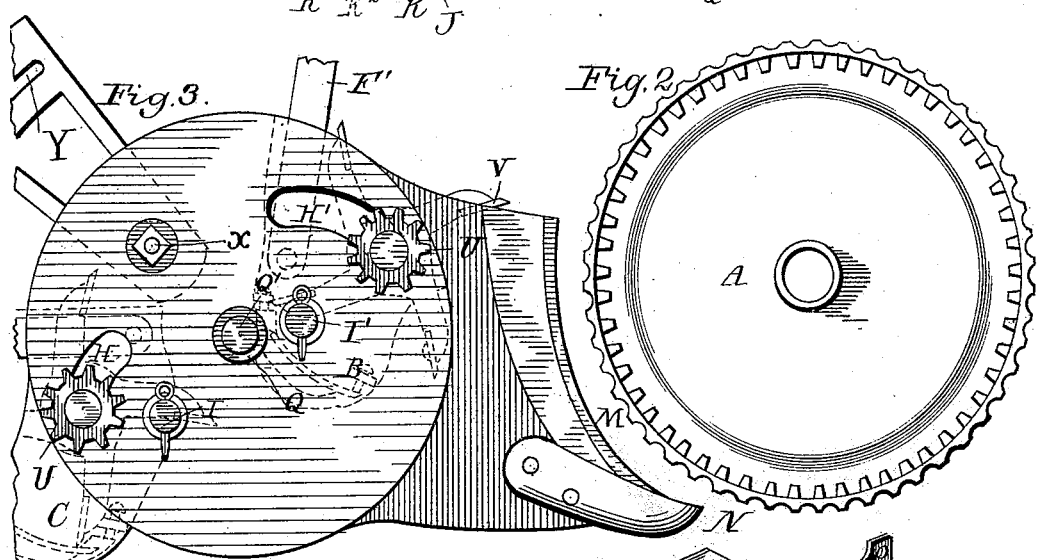
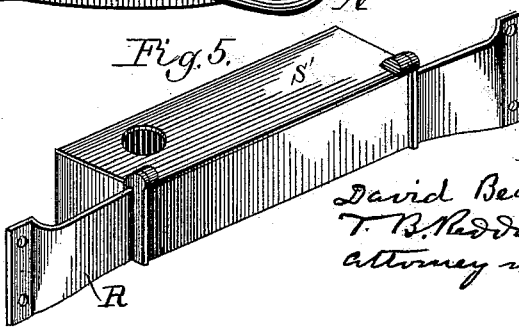
Witnesses,
Charles N. Mikels
Thomas Williams
Inventor
David Bearly by
T. B. Redding, his
attorney in fact.

(No Model.)

D. BEARLY.
LAWN MOWER.

No. 395,869.   Patented Jan. 8, 1889.

Witnesses:
Edward Hudson
Winchester H. Adams

Inventor.
David Bearly by
T. B. Redding his
Attorney in fact.

UNITED STATES PATENT OFFICE.

DAVID BEARLY, OF NEW CASTLE, INDIANA.

LAWN-MOWER.

SPECIFICATION forming part of Letters Patent No. 395,869, dated January 8, 1889.

Application filed February 19, 1887. Serial No. 228,264. (No model.)

*To all whom it may concern:*

Be it known that I, DAVID BEARLY, a citizen of the United States, residing at New Castle, in the county of Henry and State of Indiana, have invented a new and useful Improvement in Lawn-Mowers, of which the following is a specification.

My invention relates to lawn-mowers with two revolving cutters, one placed above and forward of the other, so as to form a double cutter, and also relates to the means for throwing the same in and out of gear and for operating the same, and has for its object the construction of a mower to cut higher grass than mowers usually cut. I attain these objects by the mechanism illustrated in the accompanying drawings, in which—

Figure 1 is a sectional view of the machine, showing the mechanism for throwing the revolving cutters in or out of gear and the position of the revolving cutters and stationary knife-bars in relation to each other. Fig. 2 is a view of one of the drive-wheels, one being used on each side of the mower and being similar in construction, each having a flange near the circumference at right angles to its inner surface, with cogs projecting from the inner surface of flange toward the center of the wheel. Fig. 3 is a view of the reverse side from that shown in Fig. 1 of the plate B, and shows the position of the cog-wheels which revolve the revolving cutters. Fig. 4 is a view of one of the cog-wheels of the revolving cutters, with a cross-section of the axle of the revolving cutter and of the slot, pawl, and devices for throwing the revolving cutters in and out of motion. Fig. 5 is a view of the connecting-bar uniting the two sides of the mower in the rear, which also constitutes a part of the tool-box S' attached thereto. Fig. 6 shows in perspective the parts shown in Fig. 1 with the rotary cutters removed, showing the forms of the plates B and carriers C D, and the position of the stationary knife-bars, and means for regulating the same.

Similar letters represent like parts throughout the several views.

Two drive-wheels, A, are used, one on each side of the mower. Both are alike. On the inner side, near the circumference of each of these drive-wheels, is a flange at right angles to the face of the wheel with cogs pointing to the axis of the wheel, which cogs and flange are cast as integral parts of the wheel, as shown in Fig. 2.

B B, Figs. 1 and 2, are two like plates, one covering the inner side of each drive-wheel, including the cogged flanges. Each of these plates has a narrow flange near its circumference at right angles to the plate on the side that faces away from the drive-wheel. The flange-cogs of the drive-wheels A engage with the cogs of the wheels U on the outer ends of the axles of the revolving cutters at each side of the mower when in gear and engaged in cutting.

The plates B B are held in place and in relation to the drive-wheels by means of a central shaft, Q', connecting the two sides of the machine and passing through plates B B and wheels A A.

On the forward edge of each of the plates B is attached the side cutter, M, a thin sharp metal plate, and the lifting-point N, a tooth-like projection, for cutting, gathering, and taking up tangled grass which may be in the way of the mower at those points. There is also cast upon each of the plates B as an integral part thereof a socket, E, for reception of a handle for pushing the mower when at work. These sockets project beyond the peripheries of the plates B, and each has a slot, Y, in the projecting end for regulating the position of the handles by means of bolts passing through the handles and the slots. The handles are pivoted at the lower ends by means of other bolts, X. The handles are made narrower than the space between the two flanges of the sockets E.

In each of the plates B are two slots, H H', Fig. 3, one end of each slot approaching nearer to the periphery of the plate than the other, so that the wheels U on the axles $G^2$ and $G^3$ of the revolving cutters shall, when the axles are in that end of the slot nearest the periphery, engage with the cogs of the flange of the drive-wheel A, but when in the other end of the slot shall not so engage.

Q is a hollow projecting sleeve or stud for receiving upon it as an axle the drive-wheel A and for the passage through it of the central shaft, Q'. In the flange of each of the plates B are cut notches O O' O² O³ for receiving the spring-levers F F', for throwing the revolving cutters in or out of gear and to retain them in place.

C and D are carriers for supporting the stationary cutting-knife bars, revolving cutters, and the spring-levers F F'. One of each of these carriers is pivoted to the inner side of each of the plates B by the pivots I I', which pass through the plate and are secured on the opposite side next to the drive-wheel A. To the carrier C is fastened the spring-lever F, and to the carrier D the spring-lever F', for moving their respective carriers upon their respective pivots. G in carrier C and G' in carrier D are boxes or holes for receiving the axles G² G³ of the revolving cutters, which fill these boxes, with suitable screws in the journal-boxes of axles G² G³ for taking up loss caused by wearing.

K² in carrier C and K² upon carrier D are holes for receiving the journals of the stationary knife-bars K' K', bearing the stationary knives K K. Upon each of the carriers, at a proper place above and in relation to the position of the stationary knife-bars, are cast two lugs, J J, as integral parts thereof, in which are drilled holes in which are cut screw-threads for receiving the setting-screws J' J', for regulating the pitch of the stationary bar and knife.

The ends of the axle of each revolving cutter pass through the boxes or holes G G' in the carriers C and D, that of the upper cutter through box G', and that of the lower cutter through box G in carrier C, and pass on through the slots in the plate B, and extend far enough beyond to allow of one of the wheels U to be slipped upon each end of each of said axles, which are retained in a position in the box formed by and between the drive-wheel A and plate B to allow their cogs to fully engage with the flange-cogs of the drive-wheels A A when the axles are in right position in the slots H H'. There are four cog-wheels, U, Fig. 4, one for each end of each of the axles of the revolving cutters. They are arranged each to revolve on its respective axle without turning the axle and cutter when the mower is pulled backward, and to become fixed and to revolve with its axle when the mower is pushed forward or when in gear, thereby causing the revolving cutters to revolve. This is effected by pawls W, consisting of oblong pieces of metal, which fit in slot $w$ in each end of each axle, and engage in notches $u$ in the central hole or opening of the wheel U, surrounding the axle or shaft of the revolving cutters. The wheel U, pawl W, and axle G² are shown in Fig. 4. The wheels U each have in the circumference of their central hole four notches, $u$, each occupying one-fourth of the circumference, one end of each notch commencing flush with the inner surface of hole and thence deepening toward the circumference of the wheel to a proper depth and having a square shoulder at the farther end pointing to the center of wheel, as shown in Fig. 4. When the axles of the revolving cutters are in place in the carriers C and D, and pass through slots H H' in plates B B, and have wheels U in place, they may be moved back and forth in the slots H H', and be thus thrown in or out of gear by motion of their respective carriers C and D upon their respective pivots, which motion is effected by raising the spring-levers F F' out of their respective notches O³ O and moving them till they respectively rest in O² O'. These spring-levers may be of any material—such as wood or metal—and need to be lifted but very little to change their position.

The revolving cutters and their knives are such as are used on most lawn-mowers, and are designated V V V V, &c.

T, Fig. 1, is a thin metal plate reaching from side to side of the machine between the plates B, and is slipped in between the revolving cutters to keep the grass cut by the upper cutter from falling upon and clogging the lower cutter, and is kept in place by the lugs T' T², cast upon each of the plates B. It may be readily removed and replaced.

L is a projection of the carrier C for receiving bearings for the rear roller and for regulating the height of the machine from the earth in usual manner. The central shaft, Q', passes through the center of plates B B and drive-wheels A A to the outer sides of each of the drive-wheels, and is secured in place by a nut or other means and holds the two sides of the mower together, and is assisted in this work by the cross-bar R, Fig. 5, which gives firmness and strength to the machine. This cross-bar is attached at each side to the handle-socket flanges. On the cross-bar R is a box, S', with lid, for holding tools—such as screw-driver, oil-can, &c. When the carriers C and D, pivoted to each of the plates B, the knife-bars, stationary knives, axles of the revolving cutters, and wheels U are all in place, as above described, and the two sides of the machine are secured in relation to each other by central shaft, Q', and cross-bar R, as above explained, and the spring-lever F rests in notch O² and the spring-lever F' rests in the notch O', both of the revolving cutters will be out of gear and the cogs of the wheels U will not engage with the cogs on the flanges of the drive-wheels, the axles being thrown too far back in slots H H'. If, now, I move the spring-lever F out of notch O² down into notch O³ in the flange of each of the plates B, I thereby move the carrier C in that direction, and with it all parts attached thereto, and the wheel U on each end of the axle G² is brought into engagement with the cogs in the rim-flange of the drive-wheels, and the lower revolving cutter will be in gear and can be used alone; or if I desire to use both cutters I also lift the spring-lever F' out of the notch O' in each of the plates B and carry them to notch O in plates B, and this will put the upper revolving cutter in gear and it will cut at the same time with the other, or the lower revolving cutter may be thrown out of gear, leaving only the upper one in gear, and I may cut with that alone. Each of the revolving cutters may be thrown in or out of gear simultaneously or alternately at will.

I am aware that revolving cutters, stationary bars and knives, cog-gearing, and other devices have been and are used in lawn-mowers, and I do not claim these separately, and I do not claim a lawn-mowing machine, broadly; but What I do claim as my invention, and desire to secure by Letters Patent, is—

1. In a lawn-mower, the combination of two separate and distinct revolving cutters upon separate and distinct axles, $G^2$ $G^3$, supported by carriers C D, pivoted to each of the plates B by pivots I I', the plates B, one on each side of the machine, and having projecting sleeves Q, upon which revolve the drive-wheels and through which passes the central shaft Q', the plates having slots H H', and sockets E for handles, and notches O O' $O^2$ $O^3$, for receiving and retaining the spring-levers F F', the wheels or pinions U, the flange-cogs on the wheels A, the side cutters, M, and lifting-points N, rigid with the plates B, the carriers C and D, having the lugs J J and screw J' and having attached to said carriers the spring-levers F F', the knife-bars K', each bearing the stationary knife K, pivoted in hole $K^2$, boxes G and G' in carriers C and D, for receiving the axles of the revolving cutters, the plate T, the connecting-bar R, with tool-box S', all substantially as and for the purposes set forth and described.

2. In a lawn-mower, the combination of two revolving cutters supported in movable carriers C D, attached by pivots to plates B B, the plates B B, one on each side of the machine, having projecting sleeves upon which revolve the drive-wheels A A and through which passes the central shaft, Q', the said plates B B having slots H H', sockets E for handles, and notches O O' $O^2$ $O^3$, for receiving and retaining the spring-levers F F', the wheels or pinions U, with ratchet-shaped notches in their central hole, the wheels A A, with flange-cogs, the movable carriers C and D, pivoted to the plates B B and having attached thereto the levers F F', the knife-bars K', each bearing a stationary knife, K, boxes G G' in carriers C D, for receiving the axles $G^2$ $G^3$ of the revolving cutters, the side cutters, M, and lifting-points N, the axles $G^2$ $G^3$, with slots for pawl W, the pawl W, and the connecting-bar R, the several parts arranged, as described, so that each of said revolving cutters may be simultaneously or alternately thrown in or out of gear by means of the spring-levers F F', attached to the movable carriers C D, moving said axles supported by said carriers back and forth in the slots H H', and retaining them in place by means of the levers F F', resting in the notches O O' $O^2$ $O^3$ in plates B B, substantially as and for the purposes set forth and described.

3. In a lawn-mower, the combination of the drive-wheels A A, each having a flange with cogs pointing to the central axis of the wheel, plates B B, with notches O O' $O^2$ $O^3$ in their marginal flanges, slots H H', hollow sleeve Q, and sockets E, side cutters, M, and lifting-points N, levers F F', pinions U, revolving cutters V and their axles, shaft Q', the carriers C D, pivoted to plates B, with lugs J J and boxes G G', the knife-bars K' K', and knives K, and setting-screws J' J', all substantially as and for the purposes set forth and described.

4. In a lawn-mower, the combination of the drive-wheels A A, having flange-cogs, the plates B B, with flanges having notches O O' $O^2$ $O^3$, sleeves Q, side cutters, M, lifting-points N, with carrier C, one on each side of machine, having spring-lever F, said carriers pivoted to plates B B and movable on said pivots, the slots H H' in plates B B for axles $G^2$ $G^3$ to move back and forth in as carriers C and D are moved on their pivots, and carriers D, one on each side, having spring-levers F', the cog-wheels U, with hole in center for receiving the ends of the axles of the revolving cutters, axles $G^2$ $G^3$, having a slot near each end for receiving pawl W, the four ratchet-shaped notches in the circumference of the hole in wheels U for engaging with pawl W, the pawl W, arranged to engage with said notches and to throw the cutters in gear when the mower is pushed forward and out of gear when it is pulled backward, an upper and lower revolving cutter on axles $G^2$ $G^3$, stationary knives K, central shaft, Q', and cross-bar R, with tool-box S', all substantially as and for the purposes set forth and described.

DAVID BEARLY.

Witnesses:
J. M. MOWEN,
I. W. MILLIGAN.